United States Patent Office 3,306,842
Patented Feb. 28, 1967

3,306,842
HYDROCATALYTIC TREATMENT OF WAX CONTAINING HYDROCARBON DISTILLATES
Kenneth Tupman, Anthony George Goble, and Paul Anthony Lawrence, all of Sunbury-on-Thames, Middlesex, England, assignors to The British Petroleum Company Limited, London, England, a company of England
No Drawing. Filed May 26, 1964, Ser. No. 370,353
Claims priority, application Great Britain, June 7, 1963, 22,790/63
2 Claims. (Cl. 208—111)

This invention relates to the hydrocatalytic treatment of hydrocarbons to cause breakdown to lower boiling materials, an operation now commonly referred to as "hydrocracking."

Hydro-cracking is a well known process which has been investigated and used in the field of petroleum refining to increase the production of lower boiling fractions, particularly gasoline fractions. It has, for example, been used in Europe for aviation gasoline production, being then normally referred to as "destructive hydrogenation" or "splitting hydrogenation." Interest subsequently declined, but it has been recently rearoused, with particular emphasis on processes which result in products with high iso- to normal-paraffin ratios.

The catalyst used normally have one or more hydrogeneating components, for example a metal or metal compound from Groups VI-A and VIII of the Periodic Table, on an acidic support and various hydrogenating metals have been proposed in combination with various supports. The present invention is concerned with the use of a particular hydrogenating component in a particular form.

According to the present invention a process for the hydrocracking of hydrocarbons comprises contacting the hydrocarbons at a temperature of from 500 to 850° F. and a pressure of from 500 to 5000 p.s.i.g. and in the presence of hydrogen with a catalyst consisting of tungsten on an acidic cracking support, the tungsten being at least initially in an un-sulphided form.

Although catalysts containing preformed tungsten sulphide are known to be suitable as hydro-cracking catalysts, the present invention uses tungsten in an unsulphided form with consequent advantages which will be apparent hereafter.

The absence of sulphur from the catalyst can be assured by suitable catalyst preparation techniques. For example the acidic support may be impregnated with a water soluble tungsten salt or intimately mixed with an insoluble tungsten salt and the salt plus support dried and calcined to decompose the salt. Alternatively the water soluble complex acids formed with non metals such as boron, silicon, phosphorus, arsenic and halogen (for example the boro-, phospho-, silico- and fluoro-tungstic acids) may be used to impregnate the support, which is then dried and calcined. The non metal component added in this method of catalyst preparation does not affect the hydrogenating activity of the catalyst although it may alter the acidity of the support.

After the calcination which, following normal practice is in air, the catalysts will be an oxidized state and are preferably used in this form. If desired, however, the catalysts may be subsequently reduced in an atmosphere of hydrogen to give tungsten metal.

The tungsten content of the catalyst may be within the range 0.1 to 25% wt. calculated as weight of elemental metal by weight of total catalyst. The use of high metal contents has not been found to be necessary and good activity has been found with catalysts containing only 2% wt. of tungsten. Preferably the tungsten content is in the range 2 to 15 wt.

Any of the known acidic cracking supports may be used these being normally one or more refractory oxides from Groups II to IV of the Periodic Table. For high cracking activity, the support may, for example, have a composition similar to known catalytic cracking catalysts. Thus they may be silica-alumina or silica-magnesia with silica contents of from 50 to 95% wt. by weight of the support. Halogen, particularly fluorine, may also be present in an amount of up to 10% by weight of the support. Such high activity supports are particularly suitable for gasoline-producing processes but they may also be used for producing the so-called middle distillates (i.e., products boiling in the range 150–370° C.).

Supports of lower and more selective cracking activity may be mixed oxide supports in which alumina constitutes more than 50% wt. of the support, preferably 50 to 95% wt., the other component or compounds being, for example, silica, boria or halogen. Such supports are more suitable for processes for producing middle distillates.

Preferred temperatures and pressures for the hydrocracking are 600 to 850° F. and 1000 to 3000 p.s.i.g. and the other process conditions may be chosen from the following ranges—

Space velocity: 0.1–10 v./v./hr. preferably 0.2 to 5 v./v./hr.

Gas rate: 500–20,000 s.c.f. of $H_2$/B. preferably 5000 to 15,000 s.c.f./B.

Feedstocks for the hydro-cracking are preferably petroleum fractions. They preferably boil above 150° C., and suitably boil within the range 150–600° C. (i.e., the gas oil and wax distillate fractions of a crude oil). Either gas oil (150–350° C.) or wax distillate (350–600° C.) or blends thereof may be used for gasoline producing processes; wax distillate is preferred for middle distillate producing processes, since gas oil is a desired product of the process. The feedstocks may be derived directly from crude oil or they may be the products of previous conversion processes, for example products from thermal or catalytic cracking. As with other hydro-cracking processes, it is advantageous to use feedstocks of low nitrogen content and to remove nitrogen compounds from gas which is recycled. This applies particularly to catalysts with high cracking activity such as are preferred for gasoline production. Any of the known processes of denitrogenation may be used to pretreat nitrogen containing feedstocks, a hydrocatalytic treatment being preferred. Preferably the nitrogen content of the feedstock to the hydrocracking process is not more than 50 p.p.m. by weight more particularly not more than 25 p.p.m.

The total product may be separated by distillation into desired lower boiling fractions and a higher boiling fraction and the latter may be recycled if desired. Preferably the conversion per pass is in the range 45 to 65% vol. and preferably also all the higher boiling material is recycled to give substantially total conversion based on the original feedstock. In these circumstances the amount of fresh feed in the total feedstock of fresh and recycled material will be the same as the conversion per pass.

A hydrocatalytic pretreatment for nitrogen removal is likely to desulphurise the feedstock also, but a particular feature of the catalyst used in the present invention is its independence of the presence of absence of sulphur. Sulphur free feedstocks can be processed satisfactorily, the catalyst remaining in these circumstances in an unsulphided form. Preferably the maximum sulphur content in this type of process is 20 p.p.m. by weight. With sulphur containing feedstocks, sulphiding of the catalyst may be expected to occur during processing.

However there is no marked difference in behaviour between the fresh unsulphided catalyst and a catalyst which has taken up sulphur during processing. In particular, it has been found that both forms of the catalyst give high iso- to normal-paraffin ratios in the products. In this respect the catalyst differs markedly from known catalysts containing tungsten or nickel as the hydrogenating component, where sulphiding is stated to be a necessary prerequisite for the production of high iso- to normal-paraffin ratios in the products.

The catalysts used in the present invention, are rugged and capable of being regenerated repeatedly by simple standard techniques.

This characteristic is particularly useful in combination with the use of the catalyst initially or wholly in unsulphided form. After each regeneration the process is restarted using the catalyst in unsulphided form, as claimed. Since regeneration and restarting are likely to occur many times during the total life of a catalyst, the time and trouble saved by eliminating pre-sulphiding will thus be considerable.

Having regard to the preferred features of the process given above, particularly suitable embodiments of the invention include the following:

A process for the hydro-cracking of gas oil, wax distillate or gas oil-wax distillate blends to gasoline in which a feedstock boiling in the range 150 to 600° C. containing not more than 50 p.p.m. of nitrogen, preferably not more than 25 p.p.m. of nitrogen and not more than 0.25% wt. of sulphur is contacted with an initially unsulphided catalyst consisting of 2 to 15% wt. of tungsten calculated as weight of elemental metal by weight of total catalyst on a support comprising 50 to 95% wt. of silica and 50 to 5% wt. of alumina at a temperature of from 625 to 775° F., a pressure of 1250 to 1750 p.s.i.g., a total space velocity of 0.4 to 1.4 v./v./hr. and a gas rate of 7500 to 15,000 s.c.f. of hydrogen/B., the product is separated using a cutpoint within the range 150 to 210° C. into a lower-boiling fraction and a higher boiling fraction and the higher boiling fraction is recycled to the reaction zone, the conversion per pass in the reaction zone being maintained at 45 to 65% vol. of total feed converted to lower boiling material by increasing temperature during the reaction as necessary and the amount of fresh feedstock in the total feedstock being maintained substantially equal to the conversion per pass.

A process for the hydrocracking of wax distillate to gas oil and gasoline in which a feedstock boiling in the range 350 to 600° C. containing preferably not more than 50 p.p.m. of nitrogen, more particularly not more than 25 p.p.m. and preferably not more than 0.25% wt. of sulphur is contacted with an initially unsulphided catalyst consisting of 2 to 15% wt. of tungsten calculated as weight of elemental metal by weight of total catalyst on a support comprising 50 to 95% wt. of silica and 50 to 5% of alumina at a temperature of from 600 to 850° F., a pressure of 1250 to 1750 p.s.i.g., a total space velocity of 1.0 to 2.0 v./v./hr. and a gas rate of 7500 to 15,000 s.c.f. of hydrogen/B., the product is separated into gas, gasoline, gas oil and wax distillate, the cut point between gasoline and gas oil being within the range 150 to 210°C. and the cut point between gas oil and wax distillate being in the range 350 to 400° C., the wax distillate is recycled to the reaction zone, the conversion per pass to gas, gasoline and gas oil being maintained at 45 to 65% vol. of total feed by increasing temperature during the reaction as necessary and the amount of fresh feedstock in the total feedstock being maintained substantially equal to the conversion per pass.

The total space velocity means the space velocity of total feed to the reaction (i.e., both fresh feedstock and recycled material). The conversion per pass also means the conversion to lower boiling material based on the total feed to the reaction. Since the percentage of fresh feed in the total feed is substantially the same as the conversion per pass the total conversion will be substantially 100%.

The following examples illustrate methods of catalyst preparation.

EXAMPLE 1

200 ml. of silica-alumina cracking catalyst (12.5% wt. alumina) in the form of ⅛" x ⅛" pellets were calcined at 550° C. for 2 hr. and cooled to room temperature in a desiccator. The pellets were added to a boiling, saturated solution of ammonium paratungstate which was boiled for 2 hr. and then cooled. The excess liquor was decanted and the pellets rinsed in acetone and dried at 130° C. for 2 hrs. The dried catalyst was then calcined at 700° C. for 2 hr., and stored under anhydrous conditions until required for use. The tungsten content of the catalyst was 3.5% by weight of total catalyst.

EXAMPLE 2

150 ml. of silica-alumina cracking catalyst (25 percent weight alumina) in the form of ⅛ in. by ⅛ in. pellets were calcined at 550° C. and cooled back to room tempearture in a desiccator. The pellets were added to a boiling, saturated solution of ammonium paratungstate, which was boiled for a further 4 hours and then allowed to cool to room temperature and stand for 64 hours. The excess liquor was decanted, and the pellets rinsed in two batches of acetone. They were then dried at 130° C. for 4 hours and calcined at 550° C. for 4 hours. The tungsten content of the catalyst was 7.4% by weight of total catalyst.

EXAMPLE 3

45 g. of phosphotungstic acid were dissolved in 170 ml. of deionised water, and the solution filtered to remove a slight cloudiness. 154 g. of powdered silica-alumina cracking catalyst (12.5 percent weight alumina) were calcined at 550° C. and cooled to room temperature in a desiccator. The catalyst was added to the phosphotungstic acid solution with stirring, and then allowed to stand for 20 hours. The excess liquor was decanted, and the catalyst rinsed once with acetone and dried in a forced air oven for 16 hours at 130° C. The powder was pelleted to 3/16 in. by 3/16 in. and then granulated to 8–16 mesh before calcination at 550° C. for 4 hours. The tungsten content of the catalyst was 7.1% wt. by weight of total catalyst.

The invention is illustrated by the following examples.

EXAMPLE 4

The catalyst of Example 1 was tested for hydrocracking activity and selectivity by contacting 75 ml. of the catalyst with a wax distillate of 350°–550° C. boiling range (hydrofined to a sulphur content of 0.15 percent weight and nitrogen content of 0.0045 percent weight), under the following conditions:

Pressure _____ p.s.i.g__ 1,000
Temperature _____ ° F__ 600–760
Space velocity _____ v./v./hr__ 1.0
Once-through hydrogen rate _____ s.c.f./B__ 10,000

The product was separated into gas, gasoline, gas oil, and wax distillate and conversions and selectivities determined as follows:

*Gasoline*

$$\text{Conversion } 100 \times \left\{ \frac{\text{Volume of material boiling above 177° C. in feed-volume of material boiling above 177° C. in product}}{\text{Volume of material boiling above 177° C. in feed}} \right\}$$

$$\text{Selectivity} = \frac{\text{percent wt. material produced boiling from } C_5\text{–}177° C. \times 100}{\text{percent wt. material produced boiling below 177° C.}}$$

The temperature required for 50% vol. conversion was 755° F. and the selectivity at that conversion was 80%.

*Gas Oil*

$$\text{Conversion } 100 \times \left\{ \frac{\begin{array}{c}\text{Volume of material boiling above} \\ 371° \text{ C. in feed-volume of material} \\ \text{boiling above } 177° \text{ C. in product}\end{array}}{\begin{array}{c}\text{Volume of material boiling above} \\ 371° \text{ C. in feed}\end{array}} \right\}$$

Selectivity = percent wt. material produced boiling from 177 to 371° C. ×100
─────────────────────────────────
percent wt. material produced boiling below 371° C.

The temperature required for 50% vol. conversion was 680° F. and the selectivity at that conversion was 65%.

EXAMPLE 5

The catalysts of Examples 2 and 3 were tested for hydrocracking activity and selectivity using n-octadecane as feedstock. This feedstock was sulphur and nitrogen free.

The process conditions were:

| | |
|---|---|
| Temperature _____° F__ | 500–600 |
| Pressure _____p.s.i.g__ | 1,000 |
| Space velocity _____v./v./hr__ | 1.0 |
| Gas rate (once-through $H_2$) _____s.c.f./B__ | 10,000 |

The results obtained are shown in Table 1 below.

TABLE 1

| Catalyst | Total Conversion at 600° F. percent weight | Selectivity for $C_4$–$C_7$ paraffin production | Iso/normal ratios | | | | Tungsten Content, Percent weight |
|---|---|---|---|---|---|---|---|
| | | | $C_4$ | $C_5$ | $C_6$ | $C_7$ | |
| Example 2 | 67.8 | 68 | ------ | 9.0 | 16.0 | 21.0 | 7.4 |
| Example 3 | 52.4 | 68 | 4.7 | 8.6 | 10.0 | 19.0 | 7.1 |
| Equilibrium values | ------ | ------ | 0.7 | 3.3 | 4.9 | 11.5 | ------ |

This table shows, particularly, that unsulphided tungsten on silica-alumina catalysts give iso- to normal-paraffin ratios well in excess of the theoretical equilibrium.

EXAMPLE 6

A tungsten on silica-alumina catalyst having the following composition:

| | Percent wt. |
|---|---|
| Tungsten | 6.9 |
| Phosphorous | 0.12 |
| Alumina | 12 |
| Silica, to make up to 100% wt. | | was prepared using phosphotungstic acid in the manner described in Example 3.

This catalyst was subjected to an extended hydro-cracking run to determine its stability. The process conditions were:

| | |
|---|---|
| Pressure | 1500 p.s.i.g. |
| Temperature | Altered to keep conversion constant. |
| Space velocity | 1.0 v./v./hr. |
| Gas recycle rate | 10,000 s.c.f./B. |
| $H_2S$ in recycle gas | Yes. |
| $NH_3$ in recycle gas | No—removed by water washing. |
| Feedstock | Wax distillate of 350 to 550° C. boiling range (pretreated to nitrogen content of 20 p.p.m. and sulphur content of 0.02% wt.). |

During this run the product was split into gas ($C_1$ to $C_4$) light gasoline ($C_5$ to 82° C.) heavy gasoline (82 to 177° C.) and a heavier fraction boiling above 177° C., the latter being recycled to the hydrocracking zone. The total space velocity of 1.0 v./v./hr. was made up of 0.4 v./v./hr. fresh feed.
0.6 v./v./hr. recycled material.

The heavier fraction was recycled to extinction giving a total conversion of 100% and a conversion per pass of 40% vol.

After a settling down period the catalyst gave a once-through conversion to material boiling below 177° C., of 40 percent volume at 110 HOS (Hours On Steam) for a reactor temperature of 720° F. This level of conversion was maintained until 320 HOS by increasing the reactor temperature as necessary to 725° F. At 320 HOS, the feed was changed from the wax distillate pretreated to a nitrogen content of 20 p.p.m. to one containing 40 p.p.m. and the temperature was raised to 745° F. to obtain 40 percent vol. conversion with the new feedstock. A steady 40 percent vol. conversion was maintained during the period 320 to 550 HOS by incremental temperature increases to a maximum of 755° F.

The $C_5$–82° C. and 82–177° C. yields were 38.5% wt. and 69.9% volume respectively. The $C_5$–82° C. cut had a Research Octane Number (clear) of 85/86 and a Research Octane Number (with 3 ml. TEL/USG) of 97/98.

A further run was carried out with the same catalyst, the same 40 p.p.m. nitrogen feedstock, and the same pressure and gas flow rate. The conversion per pass was, however, increased to 50% vol. and the total space velocity decreased to 0.66 (0.33 fresh feed, 0.33 recycled material). The use of these conditions permitted lower average temperatures, and hence a longer length of run (840 hours) before the temperature of 755° F. was reached.

The $C_5$–82° C. and 82° C.–177° C. yields were 40.9 and 67.1% wt. respectively and the octane numbers were similar to those obtained in the earlier run.

At the conclusion of the second run the catalyst was regenerated using the conditions described in Example 7, and a third run commenced, again with the same unsulphided catalyst and with the same process conditions as the second run. Complete restoration of activity was achieved by the regeneration, the yields obtained and temperatures used during the first 400 hours of the third run being the same as those of the corresponding part of the second run.

EXAMPLE 7

A further sample of 75 ml. of the catalyst of Example 6 was tested for regenerability by carrying out alternate process and regeneration cycles under the following conditions:

*Process cycles*

| | |
|---|---|
| Feed | As Example 4 |
| Pressure _____p.s.i.g__ | 1000 |
| Temperature _____° F__ | 750 |
| Space velocity _____v./v./hr__ | 1.0 |
| Once-through $H_2$ Rate _____s.c.f./B__ | 10,000 |

*Regeneration cycles*

At the end of each process cycle the catalyst bed temperature was maintained at 750° F. under a flow of once through hydrogen only. After a period of 2 hours under these conditions, the hydrogen was replaced by nitrogen, the flow adjusted to 900 v./v./hr. and the bed temperature maintained at 750° F. Air was then introduced with the nitrogen and the rate adjusted to give a burning temperature of 850° F. When the wave front had passed through the bed the rate of nitrogen to air was gradually adjusted until air only was passing over the catalyst at a temperature of 850° F. This was later increased to 900° F. and maintained for 2 hours to complete the calcination.

After reducing the temperature to a suitable level and purging air out of the system, first with nitrogen, then hydrogen the next process cycle was commenced.

RESULTS

| Hours on stream | Percent vol. conversion to material boiling 177° C. | | | |
|---|---|---|---|---|
| | 26-36 | 50-60 | 74-84 | 98-108 |
| Fresh catalyst | 44.8 | 28.2 | 23.3 | 22.0 |
| Once regenerated catalyst | 35.7 | 26.2 | 22.0 | 23.1 |
| Twice regenerated catalyst | 37.8 | 30.0 | 26.1 | 23.6 |

These results show that the catalyst is fully regenerable with inert gas/air mixtures.

We claim:

1. A process for the hydrocracking of wax distillate having a low sulphur content to gas oil and gasoline comprising contacting a wax distillate feedstock boiling in the range 350 to 600° C. and containing not more than 50 p.p.m. by weight of nitrogen and not more than 20 p.p.m. of sulphur with a substantially unsulphided catalyst consisting essentially of 2 to 15% wt. of tungsten, calculated as weight of elemental metal by weight of total catalyst, on a support consisting essentially of 50 to 95% wt. of silica and 50 to 5% wt. of alumina at a temperature of from 600 to 850° F., a pressure of 1250 to 1750 p.s.i.g., a total space velocity of 1.0 to 2.0 v./v./hr. and a gas rate of 7500 to 15,000 s.c.f of hydrogen/B., said contacting operation being carried out in the absence of added sulphur to the contacting zone thereby insuring no substantial sulphiding of the catalyst, separating the product into gas, gasoline, gas oil and wax distillate, the cut point between gasoline and gas oil being within the range 150-210° C. and the cut point between gas oil and wax distillate being within the range 350–400° C., and recycling the wax distillate to the hydrocracking zone, the conversion per pass to gas oil and lower being maintained at 45 to 65% vol. on total feed by increasing temperature during the reaction as necessary and the amount of fresh feedstock in the total feedstock being maintained substantially equal to the conversion per pass.

2. A process as claimed in claim 1 wherein the feedstock nitrogen content is not more than 25 p.p.m.

References Cited by the Examiner
UNITED STATES PATENTS

| 3,026,260 | 3/1962 | Watkins | 208—110 |
| 3,153,627 | 10/1964 | Beuther et al. | 208—111 |
| 3,213,012 | 10/1965 | Kline et al. | 208—110 |

DELBERT E. GANTZ, *Primary Examiner.*

A. RIMENS, *Assistant Examiner.*